United States Patent

Bauer

[15] 3,691,251
[45] Sept. 12, 1972

[54] DRYING OF GASES CONTAINING POLYMERS AND/OR POLYMERIZABLE CONSTITUENTS

[72] Inventor: Robert D. Bauer, c/o Phillips Petroleum Co., Bartlesville, Okla. 74003

[22] Filed: March 9, 1970

[21] Appl. No.: 17,449

[52] U.S. Cl..................260/683 R, 55/33, 55/75, 260/679
[51] Int. Cl...............................C07c 3/00
[58] Field of Search ......260/683, 679; 55/29, 74, 75, 55/33

[56] References Cited

UNITED STATES PATENTS

| | | | |
|---|---|---|---|
| 2,910,139 | 10/1959 | Matyear, Jr. | 260/683 |
| 3,513,631 | 5/1970 | Seibert et al. | 55/33 |
| 3,242,641 | 3/1966 | Makin, Jr. | 55/75 |
| 3,242,651 | 3/1966 | Arnoldi | 55/179 |
| 2,992,703 | 7/1961 | Vasan et al. | 55/70 |

Primary Examiner—Delbert E. Gantz
Assistant Examiner—J. Nelson
Attorney—Young and Quigg

[57] ABSTRACT

A cracked gas, for example as derived from the cracking of ethane under conditions to produce an ethylene gas containing effluent also containing polymers and/or polymerizable constituents, is passed successively through a relatively cheap absorbent or drying material and then through a molecular sieve desiccant. The polymers or polymer-forming constituents are removed from the cracked gases, albeit they are contained therein in very small amount of the order of parts per million. During regeneration of the expensive desiccant bed, the relatively cheap material is discarded as required.

8 Claims, 1 Drawing Figure

PATENTED SEP 12 1972　　　　　　　　　　　　　　3,691,251
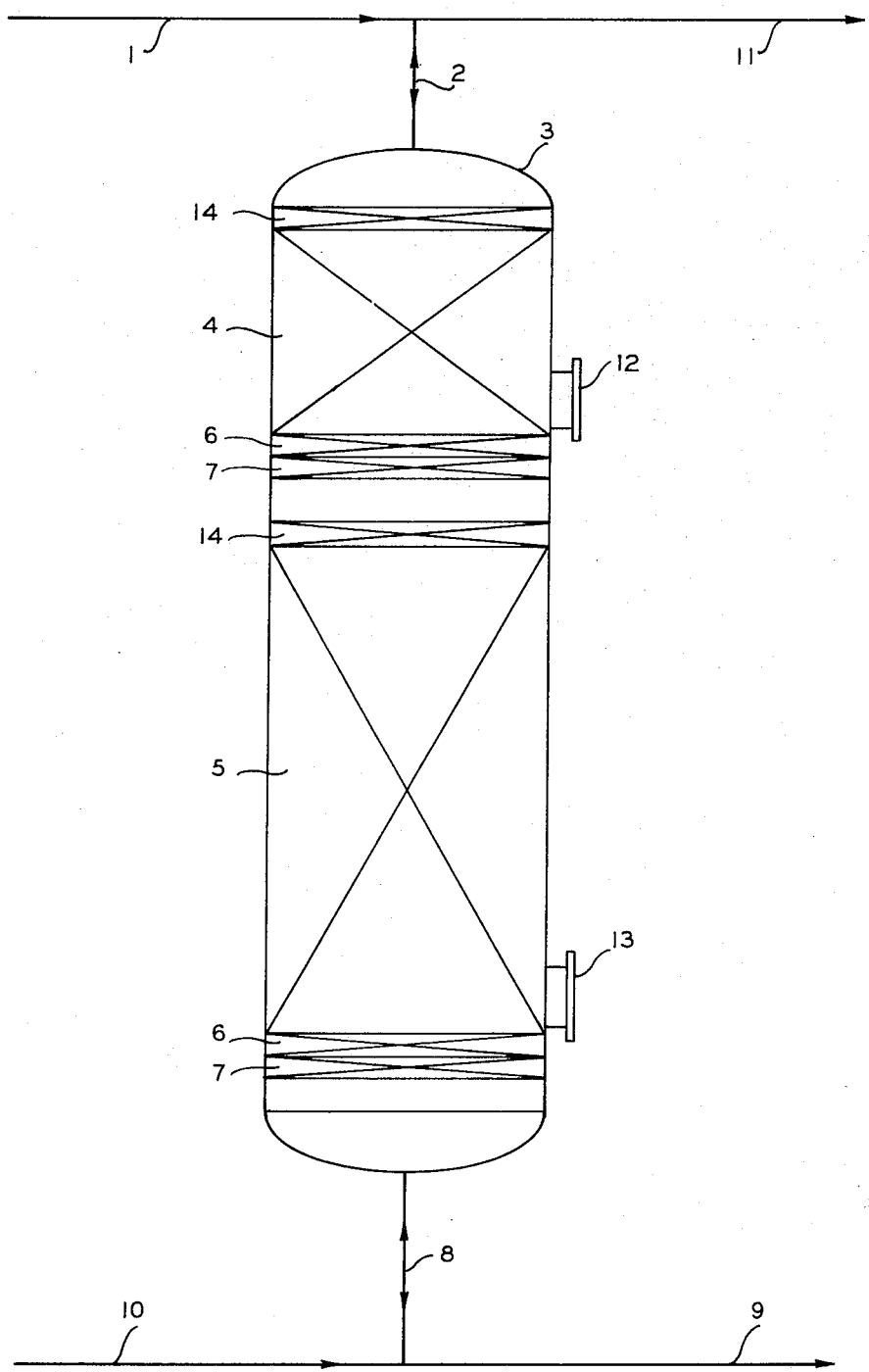
INVENTOR.
R. D. BAUER
BY Young & Quigg
ATTORNEYS

DRYING OF GASES CONTAINING POLYMERS AND/OR POLYMERIZABLE CONSTITUENTS

This invention relates to the drying of a gas. It also relates to the drying of a cracked gas, for example, a gas obtained by decomposition of a hydrocarbon such as ethane in the production of an ethylene-containing gas. More particularly, the invention relates to the protection of a relatively expensive desiccant so that it will not become fouled and so that it can be periodically regenerated to remove water therefrom.

According to a concept of the invention there is provided a method for the drying of a gas or vapor feed which contain a polymer or polymer-forming constituent which normally will cause plugging and, therefore, channeling in a relatively expensive desiccant requiring premature discarding of the same which comprises passing the cracked gases containing the polymer or polymer-forming constituent through a section or zone containing a relatively cheap absorbent or desiccant and therein removing said polymer or polymer-forming constituent by physically absorbing polymer already formed or by causing polymerization of the polymer former. In another of its concepts, the invention provides an operation for the production of a dry, gaseous effluent containing ethylene by thermally or otherwise decomposing ethane to form an ethylene-containing gas also containing diene which form polymers which tend to plug an expensive desiccant such as a molecular sieve, the operation comprising passing the gases, as containing said dienes in an amount of the order of parts per million, through a relatively inexpensive desiccant or absorbent therein to capture or deposit the polymers as such or to form polymers from any polymer-forming constituents and periodically discarding the relatively cheap desiccant or absorbent while regenerating the molecular sieve or expensive desiccant. In a further concept of the invention it provides an operation wherein a major portion of a desiccant zone or dryer is filled with a relatively expensive desiccant such as a molecular sieve which can be periodically regenerated and there is also provided upstream in the line of flow of gases to be dehydrated or dried a minor bed of a relatively inexpensive desiccant or absorbent which is periodically discarded as required. Still further, a concept of the invention provides a fuel gas resulting from gases used to regenerate the expensive desiccant bed which because it does not contain polymers does not contaminate the regeneration gas which, therefore, can be used as a fuel in burners which ordinarily otherwise would cause fouling or plugging problems.

In the drying of cracked gases, for example, a cracked propane stream containing ethylene and other unsaturated constituents, e.g., dienes, which are polymeric in nature or will form polymers or otherwise plug a desiccant, e.g., a molecular sieve, polymers are deposited or formed in the molecular sieve desiccant bed or beds. This plugs the bed causing maldistribution of the cracked gases and inadequate drying. This results in a shutdown of the dryer and necessary replacement of the foul molecular sieve (usually the top 2-3 feet in a downflow drying zone) with new material now costing approximately $1.25 a pound. The removed material is so heavily fouled that it must be discarded. This occurs about every 6-11 months in an ethylene-producing plant herein considered.

The cost of replacing molecular sieve in a single ethylene producing unit has averaged, prior to this invention, about $50,000.00 a year. Accordingly, it has been desirable to somehow enhance the life of the sieve in the desiccant service to which it has been put, treating such feeds as are evident from this disclosure.

I have now discovered, unexpectedly, that the use of activated alumina, as herein described, will remove from the gases, treated, as herein described, gum formers or polymer formers which are dienes amounting to as little as about 300 parts per million of the total gas stream. Thus, I have found that I can replace, say, two-three feet of the usual molecular sieve desiccant with, say, activated alumina, thus protecting the major portion of the bed constituted by the expensive, e.g., molecular sieve desiccant.

Thus, according to the invention there is contemplated the use of a lower cost desiccant such as an activated alumina, for example, Kaiser KA-201 costing about 20 cents a pound for the top two-three feet of the molecular sieve bed in a downflow operation. This lower cost desiccant lasts one-half to three-quarters as long in the fouling service as the molecular sieve and adequately protects the molecular sieve from polymer fouling as well as effectively removing water from the cracked gas. Accordingly, a manway is provided in the dryer vessel at the proper location for adequately and rapidly removing the polymer fouled low cost desiccant as during regeneration of the high cost desiccant. Ordinarily, the lower cost or cheap desiccant, e.g., activated alumina, will fill only or constitute a minor portion of the drying zone. The expensive, more desirable desiccant, e.g., molecular sieve, will constitute the major portion, indeed, preferably the substantial portion of the desiccant bed, the cheap material being used primarily for the purpose of removing from the cracked gases, which are passed thereinto containing polymers or polymer-forming materials or oils which would otherwise plug the molecular sieve or expensive desiccant.

U.S. Pat. No. 2,910,139, Charles Matyear, Jr., issued Oct. 27, 1959, describes and claims a method for removing moisture from a gas containing the same which comprises passing said gas through a zone containing a large quantity of a non-molecular sieve adsorbent conventionally used to remove said moisture from said gas, thus partially dehydrating said gas, then passing said gas through another zone containing a small quantity of molecular sieve material, thus substantially completing the dehydration of said gas, and then recovering said gas from which said moisture has been removed. It also describes and claims a method of producing an ethylene-containing gas having a low dew point which comprises processing a hydrocarbon gas stream containing hydrocarbons which are convertible to ethylene, separating said gas into two portions, a portion containing said hydrocarbons convertible to ethylene and another portion, passing said portion-containing gases convertible to said ethylene to a cracking zone and therein converting said hydrocarbons to ethylene, obtaining an effluent-containing ethylene, passing said effluent through a zone containing a non-molecular sieve conventional adsorbent and maintaining said effluent in contact with said adsorbent until the dew point of said effluent is as low as can be practically obtained, then passing said effluent into contact with a molecular sieve dehydrator material so as to reduce its dew point to a low desired value and then passing said effluent to ethylene recovery; passing said another portion to a preheating zone, therein heating said another portion to a temperature well in excess of that required to dehydrate said conventional adsorbent and said sieve dehydrator material and then passing said another portion to said zone into contact respectively with said molecular sieve dehydrator material and said conventional adsorbent so as to cause regeneration of said material and said adsorbent.

A specific example in the patent deals with the cracking of propane under ethylene producing conditions. Column 4, line 31. Ethane and lighter gases are removed from the operation. FIG. 2, pipe 76. The ethane-containing gas can be used as a dehydration or regeneration gas, Column 5, line 23, for regeneration of the desiccant. In the patent, Column 4, line 60, the effluent from the cracking zone is passed to an oil quench zone. In this zone and in a deoiling zone, the polymer-forming constituents which might be present are substantially removed from the cracked gases.

In the past in ethylene units using ethane as the chargestock, the oil quench and deoiling absorber operations have been omitted because the heavy materials which are produced when cracking ethane are not produced in as large a volume as from propane and heavier chargestocks. The entire ethane cracking furnace effluent, after treatment for acid gas removal and removal of trace amounts of tar and coke, has been passed through the dehydration system. As such, polymer-forming materials, e.g., cyclopentadiene, etc., are present in the gas being dried and oils plus polymers are formed and deposited on the desiccant during the process and the regeneration cycles. This has been found to occur generally over the first 2-3 feet of the desiccant bed. This results in addition to fouled desiccant in this section in larger glomerates of desiccant which causes maldistribution of the gas and resultant channeling which by-passes a large portion of the good desiccant remaining in the bed and causes it to be useless for water removal.

Since in today's modern ethylene plants molecular sieves are used for dehydration system because of their greater ability to remove water under the operational conditions there prevailing than their predecessors, e.g., activated alumina, silica gel, bauxite, etc., the problem arises that the molecular sieve fouls with polymer so that the advantage of the molecular sieve in this service, i.e., its greater absorptive capacity and longer life over the desiccants, is offset by cost of replacement. Thus, in the usual design the advantages of the sieve are lessened to a considerable extent. Thus, as the molecular sieve becomes fouled, the drying cycle for the molecular sieves shortens and it eventually becomes impossible to regenerate the sieve in time to return it to process drying. This causes reduced throughput to the ethylene-producing unit and, therefore, lost ethylene production.

Thus, a concept of the invention is that a less costly material, desiccant or other polymer-catching or forming material, e.g., bauxite, clay, silica gel, etc., that can easily be changed out when the dryer is "off-line" for regeneration is used for the top 2-3 feet of the bed. This top bed is fundamentally for preventing the polymer formed or deposited from fouling the expensive molecular sieve desiccant and not for water removal, although lower cost desiccant can be used for this purpose and have some additional benefit for water removal.

An object of this invention is to dry a gas. Another object of this invention is to dry an ethylene-containing gas. A still further object of this invention is to provide a drying or desiccating operation in which a gas containing polymers or polymer-forming or oily constituents is so dried that expensive desiccant employed in the operation is protected against fouling and, therefore, maldistribution of gases, e.g., channeling through desiccant containing portions still useful for water removal which, nevertheless, must be discarded because of the channeling. A still further object of the invention is to remove rather small quantities of polymers or polymer-forming constituents from a cracked gas, e.g., a cracked ethane feedstock. A further object of the invention is to provide for the use of a regeneration gas which has been used for regenerating a desiccant as a fuel gas while avoiding difficulty due to fouling of burners using said fuel gas when said fuel gas may be contaminated with polymers or polymer-forming constituents.

Other aspects, concepts, objects and the several advantages of this invention are apparent from a study of this disclosure, the drawing and the appended claims.

According to the present invention there is provided a method for drying a cracked hydrocarbon gas or vapor feed which contains a polymer or polymer-forming constituent which normally will cause plugging of the desiccant in a drying zone, causing channeling of the gases therethrough and need to discard a relatively expensive desiccant which otherwise can be virtually and definitely regenerated, absent said constituent which comprises providing in said zone at least two desiccant materials, an expensive desiccant and upstream therefrom in the line of flow of said feed a relatively cheap desiccant which will remove from said feed the said constituent in an amount or thickness along the line of flow to effectively substantially completely remove said constituent from said feed and passing said feed through said cheap and then through said expensive desiccant.

Still according to the invention an operation as herein described employing a composite desiccant drying zone, as herein described, is effected upon a cracked ethane gas, for example, a gas effluent obtained by cracking ethane at a temperature well in excess of about 1,500° F. and at a pressure of the order of about 10 pounds per square inch gage.

Usually in the cracking of ethane to produce ethylene in substantial quantity in the cracked effluent, the temperature will be in the approximate range of from about 1,500° to about 1,550° F. The pressure will ordinarily be in the approximate range of from about 10 psig to about 20 psig.

Still according to the invention there is provided a process wherein a relatively clean fuel gas such as ethane in heated condition is used to regenerate or dehydrate a desiccant bed such as a molecular sieve bed which is protected by a relatively cheap bed of drying material, as herein described, and is then used as a fuel gas as in a fuel gas burner without fouling of the burner difficulties because the desiccant bed has been protected as herein described and, therefore, the fuel gas has not picked up any polymers or polymer-forming constituents during the regeneration of the desiccant.

Still further according to the invention there is provided suitable apparatus as herein described for containing a composite of desiccants or drying materials, said apparatus being provided with means for removing the protecting desiccant layer, herein described, without removing the relatively expensive desiccant, for example, while the expensive desiccant is being regenerated or at least during a time when the expensive desiccant is about to be or has been regenerated and is awaiting being put back on stream.

The following table gives a specific set of conditions by way of an example with the aid of which the invention can be more fully described.

TABLE I — CONDITIONS

| | Process Drying Cycle | Regeneration Cycle |
|---|---|---|
| Hours On Stream | 12 | 12 |
| Temperatures: | | |
| Inlet, °F. | 50 | 430 |
| Outlet, °F. | 55 approx. | 410 — 100 (cooling) |
| Pressures: | | |
| Inlet, PSIA | 202 | — |
| Outlet, PSIA | — | 60 |
| Flow | | |
| Mols/hr | 8002.8 | 1400 — 1800 |
| Gas Composition, Mol Percent (Inlet Basis) | | |
| CO | 0.29 | 0.72 |
| $CO_2$ | — | — |
| $H_2$ | 28.80 | 79.44 |
| $C_1$ | 10.37 | 18.11 |
| Acetylene | 0.28 | — |
| $C_2^=$ | 34.31 | 1.50 |
| $C_2$ | 24.36 | 0.23 |
| $C_3^=$ | 0.65 | — |
| $C_3$ | 0.23 | — |
| Butadiene | 0.23 | — |
| Butylenes | 0.23 | — |
| $C_5^+$ | 0.15 | — |
| Water | 0.10 | — |
| Total: | 100.00 | 100.00 |

Upon topping the $C_5$+fraction of the above-given gas, which it is noted is but 0.15 mol per cent of the total composition to yield a kettle product with an initial boiling point of 30° C. (86° F.) and analyzing the said topped fraction, the following analysis is obtained.

TABLE II — ANALYSIS OF $C_5$+ FRACTION

| Component | Weight Percent | |
|---|---|---|
| Lights | 1.75 | |
| Pentene-1 | 0.06 | |
| 2-Methylbutene-1 | 0.20 | |
| trans-Pentene-2 | 0.12 | |
| cis-Pentene-2 ) | | |
| 1,4-Pentadiene ) | 0.15 | |
| 2-Methylbutene-2 | 0.24 | |
| Hexanes | 0.04 | |
| | | 2.56 |
| 2-Methyl-1,3-butadiene | 0.52 | |
| Cyclopentene | 0.85 | |
| trans-1,3-Pentadiene | 1.24 | |
| cis-1,3-Pentadiene | 0.79 | |
| Cyclopentadiene | 9.80 | |
| Pentadienes and/or Hexenes | 0.84 | |
| Unknown (Between Cyclopentadiene and Dicyclopentadiene) | 5.28 | |
| | | 19.32 |
| Benzene | 59.26 | |
| Toluene | 5.31 | |
| Dicyclopentadiene | 8.47 | |
| Unknown (Heavier than Dicyclopentadiene) | 5.08 | 78.12 |
| Total: | 100.00 | 100.00 |

Referring to the foregoing analysis, the dienes in the $C_5$+cut are gum formers or polymer formers. Thus, approximately one-fourth of the $C_5$+cut are dienes, or one-quarter of 0.15 mol per cent which is equal to about 300 parts per million of the total gas stream is composed of dienes. The bauxite, alumina or equivalent is found unexpectedly to remove the dienes in the gas stream sufficiently to prevent plugging of the molecular sieve bed.

The temperature of operation of the bed is in the approximate range of from about 50° to about 60° F. as earlier noted. It is surprising that at this temperature which is relatively very low, the polymer formers in such very small amount can be removed and have been removed, thus protecting the expensive molecular sieve.

Ordinarily, the inlet gas to the dryers is saturated with water vapor at a dew point of about +50° F. The effluent gas from the bauxite has a dew point of −60° F., while the effluent gas from the molecular sieve bed has a dew point of about −140° F.

Referring now to the drawing a wet feed, as herein described, is passed by 1 and 2 into vessel 3 containing activated alumina bed 4 wherein the polymers or polymer-forming constituents which would otherwise clog the major or expensive desiccant bed 5 are removed. The gas is passed through bed 5 and ultimately from vessel 3 by 8 and 9. Periodically, as when desiccant 5 requires regeneration, a hot regenerating gas such as a fuel gas, e.g., ethane, is passed by 10 and 8 through the vessel and from the vessel by 2 and 11. Preferably, prior to regenerating the bed 5 with the fuel gas, as when it is to be used in a burner which may become fouled, bed 4 is removed by manway 12 provided for this purpose. A manway 13 is provided. This manway is ordinarily not used except after very long periods of time and after many regeneration cycles applied to bed 5.

The bottom end of vessel 3 is filled with conventional support materials 6 and 7 such as crushed fire brick, gravel, rock, etc. The upper support materials 6, 7 and 14 prevent mixing of solids 4 and 5. A 2-inch thick wire mesh pad (not shown) is placed below 7 to prevent passage of solids 7 therethrough. Other materials of construction can be used, it being necessary that said materials are non-reactive to the materials in the system, and are capable of retaining solids thereon, and allowing fluid to flow therethrough.

Vessel 3 is an upright cylinder about 10 feet in diameter and about 25 feet high. The activated alumina bed 4 is about 5 feet thick, while the remainder of the column is filled with the relatively expensive molecular sieve. Support material 7 may be a 6-inch bed of ½-inch to ¾-inch gravel supported by the wire mesh pad (not shown). Support material 6 may be a 6-inch bed of ⅛-inch to ¼-inch gravel and support material 14 may be a 6-inch bed of ¾-inch to 1-inch rock.

Molecular sieve materials which may be used in my process are usually comprised of sodium, calcium, aluminum, silicon, and oxygen, and are a structure of definite crystalline pattern containing a large number of small cavities connected by a number of smaller pores. These pores and cavities are normally uniform in size and comprise about 50 per cent of the total volume of the crystals. Such sieve materials applicable in the invention are various naturally occurring zeolites or synthetic zeolites. Applicable materials are the various crystalline aluminosilicates which have been heated to remove water of hydration. Of the three classes of crystalline zeolites, fibrous, laminar, and rigid three dimensional anionic networks, the last mentioned class only is suitable in my invention. Examples of such materials include chabazite, phacolite, gmelinite, harmotome, and the like, or suitable modifications thereof. The particular sieve used in the example of my invention is known to those skilled in the art as Linde Molecular Sieve Type 3A disclosed in U.S. Pat. No. 2,882,243, and is sold by Union Carbide of 270 Park Avenue, New York, New York. Molecular Sieve Type 3A has a chemical formula $$K_9Na_3a[(AlO_2)_{12}(SiO_2)_{12}]\cdot 27 H_2O$$

with a nominal pore diameter of 3 angstroms. Of course, other pore size molecular sieves may be used, e.g., 3 angstroms up to 13 angstroms size.

Activated bauxite may be used in bed 4, although activated alumina is preferred.

It will be evident to one skilled in the art in possession of this disclosure that the invention according to a concept basic to it will permit a considerably lengthened life for expensive desiccant even in existing dryers. Thus, the loss of a few feet to a less efficient desiccant or drying material is more than made up even if somewhat more frequent regeneration is required by the considerable expense saved due to protection of the expensive desiccant.

Thus, although a very small portion of the cracked gases, herein described, contain dienes which are the principal polymer or polymer-formers, it will be seen that 1,3-pentadiene, cyclopentadiene and dicyclopentadiene (referring to Table II) constitute a very substantial portion of the $C_5+$ fraction. It is primarily to deal with this fraction or similar fractions in the drying of gases that this invention is now preferred to be applied.

Reasonable variation and modification are possible within the scope of the foregoing disclosure, the drawing and the appended claims to the invention the essence of which is that there has been provided a method for drying of a gas containing constituents which will plug or foul an expensive desiccant which comprises providing ahead of the desiccant in line of flow a relatively cheap material which will remove physically and/or chemically said constituent.

I claim:

1. A method for the drying of a cracked hydrocarbon gas or vapor feed which contains a polymer or polymer-forming constituent which normally will cause plugging of the desiccant in a drying zone, causing channeling of the gasses therethrough and need to discard a relatively expensive desiccant molecular sieve which otherwise can be virtually indefinitely regenerated absent said constituent which comprises providing in said zone at least two desiccant materials, said expensive desiccant and upstream therefrom in the line of flow of said feed a relatively cheap desiccant selected from the group comprising activated alumina, silica gel, bauxite or clay which will remove from said feed the said constituent in an amount or thickness of bed along the line of flow to effectively substantially completely remove said constituent from said feed and passing said feed through said cheap and then through said expensive desiccant.

2. A method according to claim 1 wherein the cheap desiccant is periodically removed and replaced as when the drying zone is on regeneration cycle or not being used.

3. A method according to claim 1 wherein the feed gas is a cracked ethane stream containing cyclopentadiene which is at least one constituent as described.

4. A method according to claim 3 wherein the expensive desiccant is a molecular sieve adapted to drying the gases passing therethrough and the cheap desiccant is at least one inexpensive water-removing solid, for example, activated alumina, silica gel, bauxite or clay.

5. A method for producing a dry ethylene-containing gas which comprises cracking an ethane feed gas, under conditions to produce an ethylene-containing effluent gas also containing polymers, polymer-forming or oil constituents, passing said effluent without removal of said constituents into a drying zone, providing in said zone at least two desiccant materials, an expensive desiccant a molecular sieve and upstream therefrom in the line of flow of said feed a relatively cheap desiccant selected from the group comprising activated alumina, silica gel, bauxite or clay which will remove from said feed the said constituent in an amount or thickness along the line of flow to effectively substantially completely remove said constituent from said feed and passing said feed through said cheap and then through said expensive desiccant.

6. A method according to claim 5 wherein a fuel gas is separated from the dried gases and is used in heated condition to regenerate the expensive desiccant and this is at least in part used in a burner as a fuel gas.

7. A method according to claim 1 wherein there is used a fuel gas to regenerate the expensive desiccant and the fuel gas is then used in a burner as a fuel.

8. A method according to claim 1 wherein the cracked hydrocarbon feed contains at least one of trans-1,3-pentadiene, cis-1,3-pentadiene, cyclopentadiene, dicyclopentadiene, and heavier than dicyclopentadiene.

* * * * *

UNITED STATES PATENT OFFICE

CERTIFICATE OF CORRECTION

Patent No. 3,691,251                                Dated:      September 12, 1972

Robert D. Bauer

It is certified that error appears in the above-identified patent and that said Letters Patent are hereby corrected as shown below:

Title and Abstract page:   --- Assignee: Phillips Petroleum Company   ---
         should be inserted.

Column 8, line 37, "a" should be deleted.

Signed and sealed this 17th day of April 1973.

(SEAL)
Attest:

EDWARD M. FLETCHER, JR.                          ROBERT GOTTSCHALK
Attesting Officer                                    Commissioner of Patents